July 12, 1966  W. R. AYERS  3,260,944
THERMONIC DIODE DETECTOR
Filed May 21, 1963
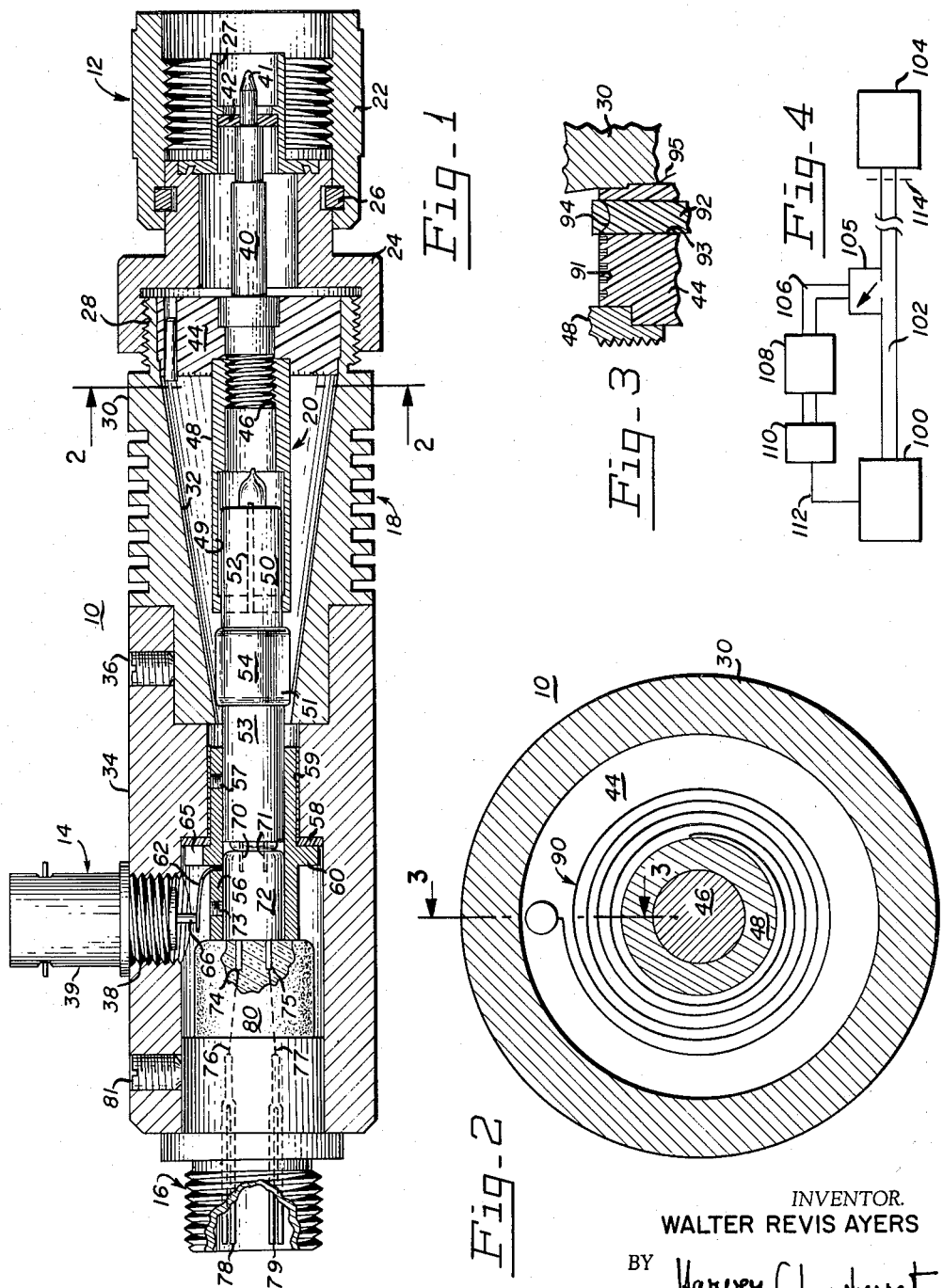
INVENTOR.
WALTER REVIS AYERS
BY Harvey G. Lowhurst
ATTORNEY

United States Patent Office 3,260,944
Patented July 12, 1966

3,260,944
THERMIONIC DIODE DETECTOR
Walter Revis Ayers, Sunnyvale, Calif., assignor to Huggins Laboratories, Inc., Sunnyvale, Calif., a corporation of California
Filed May 21, 1963, Ser. No. 282,072
7 Claims. (Cl. 329—162)

This invention relates to diode detectors, and more particularly to a low level radio frequency (RF) detector which utilizes a thermionic diode as the detecting element to provide an exceptionally large dynamic range.

The use of low level detectors for recovering the video signal from the RF signal is well known in connection with receivers. The most common type of low level detector in use today makes use of a crystal rectifier as the detecting element. The preference for crystal rectifiers over thermionic diodes as the detecting element is generally due to the fact that crystal rectifiers are less noisy and have a smaller conversion loss as a result of having an inherently negligible transit time effect. Crystal rectifiers, however, are fragile and have a limited dynamic range which, if exceeded, burns out the crystal.

The dynamic range of crystal rectifier detectors, which is defined as the ratio of the minimum RF peak power input providing a usable video output signal to the maximum RF peak power input which does not burn out the crystal, is generally limited to 100,000:1 (50 db). If the applied power exceeds the permissible maximum RF power, the crystal rectifier burns out. While for many applications, and particularly those in connection with receivers, a dynamic range of 50 db has been found quite satisfactory, there are many other applications where a greater dynamic range is desired either to provide assurance that the detector will not burn out when subjected to an overload or simply because the signal level varies over a range which is in excess of the dynamic range of the crystal rectifier.

For example, where the RF peak power of the input signal has a range which is close to the dynamic range of a crystal rectifier it has been necessary heretofore to pad the input signal so that the maximum power is well below the burnout power of the crystal thereby sacrificing detection of signals at the lower power level which are now below the minimum sensitivity of the detector. Also, in very high power generator systems in which the power source, such as for example a klystron, is coupled through a ceramic window to a waveguide connected to a load, there often exists the danger of arcing due to some mismatch or some other cause in the load. The development of an arc in the waveguide causes the reflection of the RF power back towards the klystrons to damage the ceramic window. To prevent such damage it has been customary to detect the power level of the reflected RF power and to initiate a control signal when the reflected power exceeds a selected level to disable the RF power source.

For this type of application, a detector having a large dynamic range is desired so it will provide an output when the reflected energy is very small indicating normal operation, and will not burn out when arcing occurs and increases the power level of the reflected RF power many orders of magnitude. Utilization of a crystal rectifier detector for such an application requires a padding sufficient to prevent burnout at arcing which usually decreases the sensitivity of the detector to a point at which it does not provide an output signal during proper operation of the system so that there is no assurance whether or not is is operating properly. Without such assurance there is no way of properly safeguarding the high power system against damage.

It is therefore a primary object of this invention to provide a detector having a dynamic range substantially in excess of 100,000:1.

It is a further object of this invention to provide a detector which can be economically manufactured and which has a very high reliability.

It is another object of this invention to provide a detector which has a dynamic range in excess of 10,000,000,000 to 1 and which provides square law detection over a dynamic range in excess of 100,000 to 1.

It is still a further object of this invention to provide an RF power transducer which is ideally suited for monitoring changes in power in excess of 100 db and which is ideally suited for incorporation into the feedback circuit of a high power RF system to protect the same damage due to excessive reflection.

It is still another object of this invention to provide a detector which is not damaged by pulse power overloads within 150 db of its minimum detectable signal.

It is also an object of this invention to provide a rugged, reliable and economical RF signal detector which utilizes a thermionic diode as its rectifying element and which is constructed for operation with RF signals from below 100 to above 11,000 megacycles per second.

Generally speaking, the diode detector of this invention is constructed in the form of a coaxial device in which a thermionic diode forms a portion of its inner conductor. The detected signal is applied to a coaxial structure which is coupled to and makes a right angle with the coaxial device. The coaxial device is terminated by a large capacitive impedance between its center and outer conductors to provide an RF signal return path.

Other objects and a better understanding of the invention may be had by reference to the following description, taken in conjunction with the accompanying drawings, in which:

FIG. 1 is a cross sectional view of the diode detector of this invention;

FIG. 2 is an enlarged section taken along line 2—2 of FIG. 1;

FIG. 3 is a section taken along line 3—3 of FIG. 2; and

FIG. 4 is a schematic diagram of a high power RF system utilizing the diode detector of this invention in a feedback path to control the generation of RF power in accordance with the magnitude of the reflected RF power.

Referring now to the drawings, and more particularly to FIGS. 1 to 3 thereof, there is shown an embodiment of a diode detector constructed in accordance with this invention and designated by reference character 10. Detector 10 is a RF coaxial transmission structure having an input connector 12 to which the RF signal is applied, an output connector 14 from which the detected signal is available, and a heater connector 16 to which heater power is applied for the diode.

The coaxial transmission structure comprises generally an outer conductor 18 and a center conductor 20 which will be explained in detail hereinafter. Input connector 12 and output connector 14 may be conventional connectors such, as for example, type N (male) and type BNC (female) respectively and do not form any part of this invention.

Outer conductor 18 includes a nut coupling member 22 forming part of input connector 12 which is rotatably coupled to a male connector member 24 by means of a washer spring 26 so that nut coupling member 22 may be rotated with respect to connector member 24. Male connector member 24 supports a contact finger member 27 which forms the input portion of outer conductor 18 and has an internally threaded end portion 28 on the other end which engages the threaded end portion of an input transformer 30. Transformer 30 is provided with a tapered bore 32 which decreases in diameter towards the output end of detector 10. Input transformer 30 is provided with a cylindrical boss of reduced diameter for engaging the mating bore of a detector body 34 and to which it may be fastened by a set screw 36.

Detector body 34 is provided by a threaded bore 38 through its cylindrical wall and at right angles to its center line for engaging the outer conductor 39 of output connector 14. All above described parts, when assembled, provide a hollow structure having a bore which is symmetric with respect to its axis.

Center conductor 20 includes an input center pin 40 which is supported at its front end by a Teflon gasket 42 carried by finger member 27 into which gasket 42 may be press fitted. The rear end of center pin 40 is supported by a Teflon support bead 44 carried by connector member 24. Support bead 44 is dimensioned to provide an optimum match of diode detector 10 when coupled to an input line. Center pin 40 has the standard pointed end portion 41 on the detector input end and is coaxially supported with respect to outer conductor 18 by gasket 42 and bead 44.

The other end of center pin 40 is threaded at 46 to engage a tubular anode holder 48 which is provided with a bore 49 at its other end dimensioned to engage the anode shank portion 50 of a thermionic diode 51. To provide a good clamping support of shank portion 50, the clamping end portion of holder 48 is provided with a plurality of slots 52 which permit the insertion of a body slightly larger in diameter than bore 49 into the same with resulting spreading of the cylindrical wall of holder 48 and the subsequent clamping contact. Diode 51 also has a cathode shank portion 53 separated from anode shank portion 50 by a glass portion 54. A suitable diode for practicing this invention is the RCA No. 6173 diode or its equivalent.

There is also provided a tubular cathode holder 56 which engages the cathode shank portion 53 and which may be locked thereto by a set screw 57 radially mounted into the tubular wall. It is immediately evident that withdrawal of holder 56 to the left as viewed in FIG. 1 causes diodes 51 to be carried with it since it is locked to holder 56 and only clamped to holder 48. Cathode holder is carried by detector body 34 and is insulated therefrom by a glass fiber washer 58 and a layer of Teflon tape 59 or the equivalent. Cathode holder 56 has a shoulder 60 which bears against washer 58 and which provides axial seating means.

Cathode holder 56 has a radially extending opening behind its shoulder 60 into which a spring clip 62 is soldered. Spring clip 62 is disposed to conductively engage the center conductor 66 of output connector 14. So that cathode holder 56 may be rearwardly withdrawn, shoulder 60 is provided with a cutout 65 to clear center conductor 66 during said withdrawal. In this manner rearward removal of the assembly carrying diode 57 is provided for.

Thermionic diode 51 has a pair of heater leads shown at 70 and 71 respectively to which heater power, such as for example 6.3 volts at 135 milliamps, is applied. A standard Cinch plug 72, commercially available as connector to heater leads 70 and 71, is carried in the other end of cathode holder 56 and is locked thereto by means of a set screw 73. The other end of Cinch plug 72 has a pair of sturdy connector leads 74 and 75 conductively connected to leads 70 and 71 respectively. In this manner, diode 51 is readily removed from holder 56 without soldering or the like by merely withdrawing holder 56 and opening set screw 57.

For convenience of withdrawing Cinch plug 72, and thereby holder 56 locked thereto, and for assuring that there be no damage to a pair of heater leads 76 and 77 which respectively connect contact leads 74 and 75 to heater connector terminals 78 and 79 of connector 16, Cinch plug 72 and connector 16 are connected to form a single rigid structure by a potting compound 80 which also pots leads 78 and 79. A set screw 81 secures connector 16 in place. It is immediately apparent that opening of set screw 81 releases connector 16 which can now be withdrawn towards the rear and which carries with it Cinch plug 72, holder 56 locked to plug 72, and diode 51 locked to holder 56. This configuration makes assembly of the detector as well as replacement of the diode very simple.

To provide the necessary direct current path between center conductor 20 and outer conductor 18 ahead of diode 51, a conductive spiral 90 is utilized which is carried by bead 44. One end of spiral 90 is in conductive connection to outer conductor 18 and the other end is conductively connected to inner conductor 20. The number of turns of spiral 90 is selected so that its inductive impedance at the RF frequency is very large and effectively an open circuit.

Spiral 90, as best seen in FIG. 3, is embedded into bead 44 for rigid support. For this purpose a continuous groove 91 is provided in bead 44 which accommodates the wire of which spiral 90 is constructed. The inner end of the spiral wire is slipped into the bore of bead 44 so that, as bead 44 is fitted over holder 48 by tightening pin 40, a good conductive contact is made. The outer end of the spiral wire is secured in place by providing an opening 93 in bead 44 and inserting therein a plug 92 which secures wire portion 94 between bore 93 and plug 94. The loose end 95 of the wire is then bent over the outer peripheral surface of bead 44 to be urged against the bore in transformer 30 as member 24 is tightened thereon.

Taper 32 in transformer 30 provides the impedance transformation between the standard 50 ohm input impedance of detector 10 and the input impedance of diode 51 as is well understood by those skilled in the art. It has been found that the input impedance of diode 51 is considerably less than that of connector 12, say about 5 ohms.

To provide the necessary RF current path between outer conductor 18 and inner conductor 20 behind diode 51 a large capacitive coupling therebetween is provided, the capacitive impedance of which at the RF frequency is negligible. This capacitive coupling exists between cathode holder 56 and detector body 34 and, more particularly, across washer 58 and tape 59. The thickness of washer 58 and tape 59 and therefore the separation between holder 56 and body 34 are dimensioned to provide the necessary capacitive coupling.

A diode detector constructed in accordance with this invention has been found to have an impedance entirely independent of the power level. Furthermore, with utilization of an RCA No. 6173 diode it has been found that the detector has a sensitivity in excess of 150 millivolts per milliwatt and a square law characteristic which extends from below a peak power input of $10^{-7}$ watts to above a peak power input of $10^{-2}$ watts for a frequency of 2.9 kilomegacycles per second and thereafter deviates very slightly from its square law characteristic to the end of its dynamic range. The dynamic range has been found to extend from below $10^{-7}$ watts to above $10^{+3}$ watts of peak power input with a response time of less than ½ of a microsecond.

Referring now to FIG. 4 there is shown an application for which the diode detector of this invention is ideally suited because of its extended dynamic range. A source 100 of RF energy such as, for example, a klystron is connected by means of a wave transmission line 102 to a utilization device 104 such as a load. Transmission line 102 incorporates a directional coupler 105 to direct a certain proportion of energy reflected towards source 100 into a wave transmission line 106. A diode detector 108, constructed in accordance with this invention, has its input terminal connected to transmission line 106 to detect the power level of the energy reflected towards source 100.

The output terminal of detector 108 is applied to a control signal means 110 whose output is connected, by means of lead 112, to source 100. Source 100 is made responsive to the control signal in some manner. For example, the control signal may deactivate the RF power source 100.

The detector of this invention is particularly useful in connection with the protection of ceramic windows on high power systems in which the occurrence of an arc in transmission line 102, such as shown at 114, creates a reflective wall causing the reflection of substantially all the RF energy from source 100 and destruction of the window. Since coupler 105 directs a portion of this reflected energy to detector 108 for detection, the sudden reflection of a large amount of energy causes the generation of a large detected signal which triggers means 110 to initiate corrective action.

The advantage of utilizing a detector constructed in accordance with this invention is its dynamic range which makes it possible to constantly monitor the reflected signal during normal operation since the dynamic range allows the detected power to increase as much as 150 db before damaging the detector. When a crystal rectifier is utilized in a detector the amount of energy normally sent back to the detector is purposely kept below the sensitivity level of the detector since a sudden increase of power of many million times must be kept below the maximum and the dynamic range of the detector to avoid damage thereto. As a consequence of such padding there is no constant indication that the detector is operating and safeguarding the power system from damage.

There has been described hereinabove a new and novel diode detector which has a dynamic range in excess of 100 db and perhaps even in excess of 150 db so that it is capable of withstanding the application of much higher power than is normally possible with crystal detectors. Further, the detector is constructed so that it may easily be disassembled and assembled for exchange of the diode.

What is claimed is:
1. A detector comprising:
 a tubular housing;
 an axially disposed structure within said housing, including, in sequence,
  an input pin member,
  an anode holder having one end rigidly connected to said pin member, the other end of said anode holder being formed with a clamping means,
  a thermionic diode having an anode shank portion and a cathode shank portion, said anode shank portion being engaged by said clamping means,
  a cathode holder engaging said cathode shank portion, and
  a heater connector means, said cathode holder engaging said heater connector means and including locking means for locking said heater connector means to said cathode holder;
 coaxial output connector means radially disposed with respect to said housing, the outer conductor of said coaxial connector means being conductively connected to said tubular housing and the inner conductor of said coaxial connector projecting into said housing for contact with said cathode holder;
 conductive means coupling said tubular housing to the portion of said axially disposed structure mediate said input pin member and said anode shank portion; and
 capacitive means coupling said tubular housing to said cathode shank portion.

2. A detector comprising:
 a tubular housing;
 an axially disposed structure within said housing, said housing and said structure respectively defining the outer and center conductor of a coaxial transmission line, said axially disposed structure including in sequence;
  an input pin member;
  an anode holder having one end rigidly connected to said pin member, the other end of said anode holder being formed with axially disengageable radial clamping means,
  a thermionic diode having an anode shank portion, a cathode shank portion and a pair of heater leads axially with said cathode shank portion, said anode shank portion being engaged by said radial clamping means,
  a tubular cathode holder engaging said cathode shank portion and having locking means for securely locking said cathode shank portion to said cathode holder,
  a Cinch plug including a pair of leads engaging said heater leads, said cathode holder carrying said Cinch plug and including locking means for securely locking said Cinch plug to said cathode holder;
  a heater connector means including a pair of leads engaging the leads of said Cinch plug, said connector means being bonded to said Cinch plug, and
  a spring clip mounted to said cathode holder;
 a coaxial output connector radially disposed with respect to said coaxial transmission line, the outer conductor of said coaxial connector being conductively connected to said tubular housing and the inner conductor of said coaxial connector projecting into said housing for contact with said spring clip;
 conductive means coupling said tubular housing to the portion of said axially disposed structure mediate said input pin member and said anode shank portion; and
 capacitive means coupling said tubular housing to said cathode holder.

3. A detector in accordance with claim 2 in which said tubular housing includes a tapered portion for matching the impedance of the coaxial transmission line portion coextensive with said diode to the coaxial transmission line portion coextensive with said input pin member.

4. A detector in accordance with claim 2 in which said tubular housing includes a locking means for locking said heater connector means to said tubular housing and wherein said spring clip is so arranged that axial withdrawal of said heater connector means together with said Cinch plug bonded thereto, said cathode holder locked to said Cinch plug and said diode locked to said cathode holder, causes sliding disengagement with the inner conductor of said coaxial output connector.

5. A detector in accordance with claim 2 which includes a nonconductive spacer between said tubular housing and said axially disposed structure, said spacer including a spiral groove in a face substantially transverse to the axis of said structure for accommodating said conductive means.

6. A diode detector comprising:
 a coaxial transmission structure defining a center and an outer conductive member, said center conductive member including a first and second axially engageable portion, said first portion including a pin member having a tubular end portion dimensioned to receive one end portion of a diode, said tubular end portion being axially slotted to provide axially releasable radial clamping to said diode, said second portion including said diode, a tubular member dimensioned to receive the other end of said diode and having locking means to lock the same to said tubular member, heater lead connector means carried by and locked to said tubular member, and elastic clip means connected to said tubular member, said clip means extending parallel to the axis of said outer conductive member and being offset with respect thereto;
 a coaxial output connector disposed at right angles to said transmission line and carried by said outer conductive member, the inner conductor of said output connector being in pressure contact with said clip means;
a conductive spiral; and
a nonconductive plug carrying said first portion within said outer conductive member, said plug including a spiral groove accommodating said spiral, the ends of said spiral being conductively connected respectively to said outer conductive member and said first portion.

7. A diode detector comprising:
a tubular housing;
an axially disposed structure within said housing, including in sequence, a pin member forming its input portion, an anode holder carried by said pin member having an axially disengageable clamping means, a thermionic diode having an anode shank portion engaged by said disengageable clamping means and a cathode shank portion and a pair of heater terminals, a cathode holder for engaging said cathode shank portion, locking means for securely locking said cathode shank portion to said cathode holder, and a heater plug having a pair of pins conductively connected to said heater terminals;
a coaxial output transmission line, radially disposed with respect to said housing, having its outer conductor connected to said housing and its center conductor coupled to said anode shank portion;
conductive means between said cathode shank portion and said housing, said conductive means providing substantially a short circuit to direct current and an open circuit to alternating current at the detector operating frequency;
capacitive means between said anode shank portion and said housing to provide substantially a short circuit to alternating current at the detector operating frequency; and
means for applying heater current to said heater plug.

References Cited by the Examiner

UNITED STATES PATENTS

| | | | |
|---|---|---|---|
| 2,555,151 | 5/1951 | Noyes | 329—162 |
| 3,002,155 | 9/1961 | Dees | 329—162 |
| 3,079,564 | 2/1963 | Bogle et al. | 329—203 X |

HERMAN KARL SAALBACH, *Primary Examiner.*

ALFRED L. BRODY, ELI LIEBERMAN, *Examiners.*

P. L. GENSLER, *Assistant Examiner.*